United States Patent [19]
Kakabaker et al.

[11] Patent Number: 5,762,342
[45] Date of Patent: Jun. 9, 1998

[54] MECHANICAL SEAL WITH CONTROLLER FOR REGULATING FACE CONTACT PRESSURE

[75] Inventors: Kenneth G. Kakabaker; Corey Angst, both of Kalamazoo, Mich.

[73] Assignee: Durametallic Corporation, Kalamazoo, Mich.

[21] Appl. No.: 642,344

[22] Filed: May 3, 1996

[51] Int. Cl.$^6$ .................................................. F16J 15/32
[52] U.S. Cl. ........................ 277/306; 277/319; 277/387
[58] Field of Search ............................ 277/2, 3, 74, 75, 277/26, 27, 59, 65, 96.1, 306, 319, 387

[56] References Cited

U.S. PATENT DOCUMENTS

| | | | |
|---|---|---|---|
| 2,834,619 | 5/1958 | McNab | 286/9 |
| 3,297,329 | 1/1967 | Smith et al. | 277/3 |
| 3,334,905 | 8/1967 | Horwitz et al. | 277/3 |
| 3,389,434 | 6/1968 | Cleereman et al. | 277/96.1 |
| 3,527,465 | 9/1970 | Guinard | 277/96.1 |
| 3,591,188 | 7/1971 | Eisner | 277/65 |
| 4,180,332 | 12/1979 | Twist | 277/27 |
| 4,290,611 | 9/1981 | Sedy | 277/27 |
| 4,299,398 | 11/1981 | Wahl | 277/3 |
| 4,434,987 | 3/1984 | Albers et al. | 277/80 |
| 4,447,063 | 5/1984 | Kotzur et al. | 277/26 |
| 4,533,147 | 8/1985 | Sando et al. | 277/26 |
| 4,643,437 | 2/1987 | Salant et al. | |
| 4,691,276 | 9/1987 | Miller et al. | |
| 4,722,534 | 2/1988 | Wentworth | 277/28 |
| 5,498,007 | 3/1996 | Kulkarni et al. | 277/65 |
| 5,529,315 | 6/1996 | Borrino et al. | 277/3 |

FOREIGN PATENT DOCUMENTS

| | | | |
|---|---|---|---|
| 242876 | 9/1989 | Japan | 277/26 |

OTHER PUBLICATIONS

Flexibox article, "A Solution to Slurry Sealing Problems" (2 pages).

Flexibox article, "Flue Gas Desulphurisation" (15 pages).

STLE article by Richard F. Salant, Paul Wolff and Samuel Navon, "Electronically Controlled Mechanical Seal for Aerospace Applications–Part I: Design, Analysis, and Steady State Tests", 1993 (7 pages).

Primary Examiner—Daniel G. DePumpo
Attorney, Agent, or Firm—Flynn, Thiel, Boutell & Tanis, P.C.

[57] ABSTRACT

A mechanical seal assembly for creating a sealing relationship between a housing and a shaft which is rotatable relative thereto. The seal assembly includes first and second coaxially aligned and axially adjacent seal rings disposed in an encircling relationship to the shaft and having axially adjacent and opposed flat seal faces for creating an annular sealing region therebetween. The first and second seal rings are respectively nonrotatably coupled to the housing and the shaft. A chamber is defined adjacent one seal ring and is in communication with a controlled pressurized fluid source which supplies a fluid to the chamber. The chamber opens toward a rear surface of the seal ring to apply a closing force to the seal ring to axially move the seal ring toward the opposing seal ring. The controlled pressurized fluid source is operatively connected to an operating condition sensor, preferably a temperature differential sensing arrangement, which detects the condition of a fluid film between the sealing faces and adjusts the pressure on the first seal ring to vary the gap condition.

24 Claims, 3 Drawing Sheets

MECHANICAL SEAL WITH CONTROLLER FOR REGULATING FACE CONTACT PRESSURE

FIELD OF THE INVENTION

This invention relates to a fluid face seal assembly, commonly referred to as a mechanical seal, and more particularly, to a mechanical seal having an axially movable seal ring which is biased toward a second seal ring by a controlled variable closing force.

BACKGROUND OF THE INVENTION

Mechanical seal assemblies are used extensively in rotating equipment to create a sealed relationship between a housing and a shaft which is rotatable relative thereto. The mechanical seal assembly typically includes a pair of annular seal rings which are respectively sealingly and nonrotatably coupled to the shaft and housing, and which have opposed flat seal faces which are normally urged toward one another to create a substantially sealed relationship between a high pressure zone disposed adjacent one radial edge of the seal faces, and a low or atmospheric pressure zone disposed adjacent the other radial edge thereof.

In conventional seal assemblies, face contact pressure between the seal faces is generated by a spring acting upon a back surface of one of the seal rings which provides a substantially constant closing force to bias the one seal ring towards the other and prevent or minimize leakage of process fluid. These seals are designed to optimize performance during typical operating conditions where closing forces are carried by seal face contact and the process fluid being pumped. While heat is generated by seal face contact and viscous shearing, the process fluid is effective to dissipate heat being generated. Additionally, in double seals which have a barrier chamber, a barrier fluid, such as Ea gas or liquid, is supplied to the barrier chamber which provides a barrier against process fluid leakage and further assists in reducing heat generation.

Efficient operation of the mechanical seal, however, is prevented during upset conditions, such as off-design performance, zero process fluid pressure, dry running or pump cavitation conditions. During such upset conditions, the constant seal face closing load provided by conventional springs is carried solely by contact between the seal faces which thereby increases the frictional contact and results in increased heat generation between the seal faces. Additionally, the loss or reduction of process fluid adjacent the seal rings eliminates or reduces the heat dissipating function served thereby. As a result, temperatures generated between the seal rings may exceed the ratings of the seal face materials as well as elastomeric o-rings which are provided to prevent flow of process fluid around the seal rings. Accordingly, seal damage can occur and if the seal is operated long enough under upset conditions, the seal may fail such that an undesirable leakage of barrier fluid into or process fluid out of the pump chamber occurs.

While some mechanical seals have been designed so as to react to seal conditions such as temperature and pressure, these known seals do not accommodate upset conditions as discussed above. For example, U.S. Pat. No. 4,643,437 discloses a non-contacting mechanical seal which applies a deforming force which deforms a fixed seal ring to vary the convergence of one seal face relative to the other and thereby vary a gap formed between the two seal rings. The other seal ring, however, cooperates with a spring which applies a constant closing force to the other of the seal rings. Thus, this arrangement does not vary the thrust load or closing force of one seal ring relative to the other, does not provide for varying face contact pressures and accordingly, does not accommodate upset conditions. Further, this arrangement does not maintain the seal faces parallel which is desirable in some seals.

U.S. Pat. No. 4,691,276 relates to the control system for the non-contacting mechanical seal assembly disclosed in the aforementioned U.S. Pat. No. 4,643,437. The mechanical seal assembly similarly adapts to operating conditions by providing a localized force on a fixed seal ring to deform the seal ring and vary the convergence of the seal faces. While these seal arrangements vary the seal face gap during operation by varying seal face convergence, upset conditions are not accommodated and the faces do not remain parallel.

Accordingly, it is an object of this invention to provide an improved mechanical seal which readily adjusts to operating conditions. In particular, it is an object of this invention to provide a variable closing force on at least one seal ring of a pair of opposed seal rings which is usable in a contacting seal arrangement to vary the face contact pressure resulting from the closing forces.

It is a further object of this invention to provide an improved seal assembly, as aforesaid, having only one seal ring movable relative to the other where the movable seal ring is biased toward the other by a variable control means for varying the closing force. It is desirable that the variable control means not only vary the closing force but distribute the closing force being applied to the movable seal ring across a back seal face which extends radially over at least a substantial portion of the thickness of the seal ring. As a result, distortions due to localized closing forces are reduced so that the seal faces remain parallel.

Still another object of this invention is to minimize if not eliminate the closing forces acting upon the seal rings during upset conditions so as to minimize heat generation between the seal faces. Further, it is an object to eliminate springs or other equivalent structures which bias one seal ring towards the other under a substantially constant load so as to not only minimize heat generation but also to simplify manufacture of the seal rings and minimize manufacturing costs.

According to the present invention, in a preferred embodiment thereof, there is provided an improved mechanical seal having a pair of opposed seal rings, one nonrotatably connected to the housing, the other nonrotatably connected relative to a rotating shaft so as to rotate in combination with the shaft. The seal rings are maintained closely adjacent one another, with the first seal ring connected to the housing being axially movable relative thereto. The second seal ring connected to the shaft is axially restrained. Pressure means are provided which act on the movable first seal ring to selectively urge the first seal ring toward and away from the second seal ring to vary the seal face pressure between the seal faces depending upon the particular operating conditions encountered.

The pressure means includes a chamber which preferably has at least one open end thereof enclosed by a back face of the first seal ring which faces away from the seal face. The chamber is in communication with the pressure means to provide a pressurized fluid therein which acts upon the back face of the first seal ring to vary the closing force being applied thereto and, as a result, vary the seal face contact pressure formed between the opposing seal faces. The pressure means is operatively connected to temperature sensing means which detects a temperature differential between the temperature of one seal face and, preferably, the temperature of the process fluid chamber to detect temperature variations which result from undesirable face contact. In response to the temperature differential, the pressurized fluid is varied to vary the closing forces. In the case of a higher than desired temperature differential, the closing force is reduced to thereby reduce face contact pressure and heat generation.

Preferably, the back face of the seal ring extends radially across a substantial portion of the radial thickness of the first seal ring so that the pressurized fluid applies a closing force which is distributed over a relatively large radial area of the seal ring whereby distortion of the seal rings is minimized.

Other objects and purposes of the invention will be apparent to persons familiar with seal assemblies of this general type upon reading the following specification and inspecting the accompanying drawings.

Figure 1:
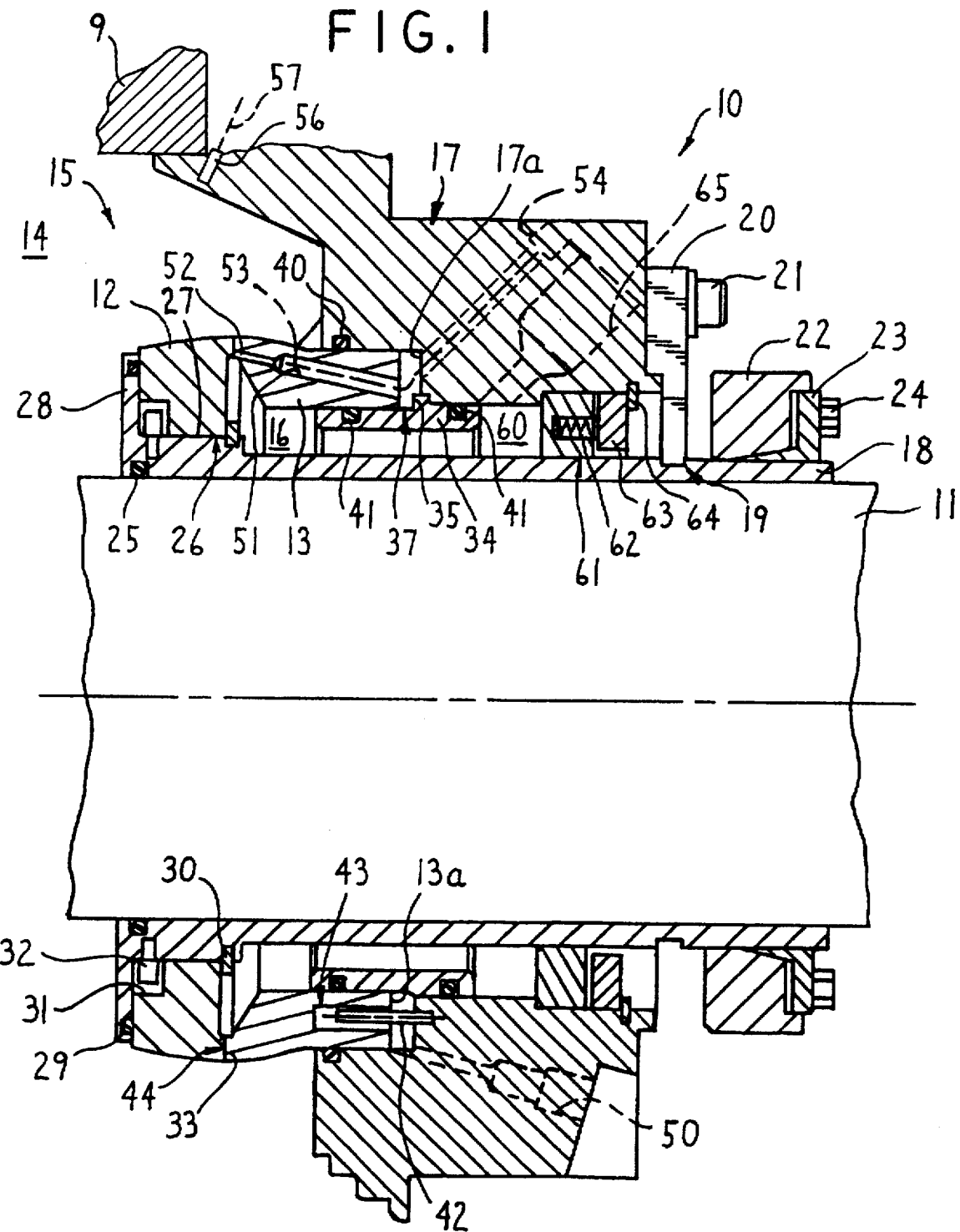
FIG. 1 is a partial side elevational view in cross section of a mechanical seal assembly according to the invention mounted on a rotatable shaft.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the invention relates to a mechanical seal 10 which cooperates between a housing 9 and a rotatable shaft 11. The mechanical seal 10 includes opposed seal rings 12 and 13 which are disposed closely adjacent one another in an opposed sealing relationship to seal a radially outer pressure zone 14 of process fluid contained within a housing chamber 15, and a radially inner pressure zone 16 which in the illustrated preferred embodiment has a lower pressure relative to the higher pressure of the fluid in zone 14 and is separated from atmospheric pressure.

More particularly, the rotatable shaft 11 is a driven component of rotatable equipment (not illustrated) such as a compressor, pump, mixer or other similar equipment which drives the shaft 11 from the illustrated rightward side thereof. The leftward side of the shaft 11 is operatively connected, for example, in the case of a pump to an impeller (not illustrated) or other similar driven component. The discussion hereafter will refer to the connection of the mechanical seal 10 to a shaft of a pump for descriptive purposes although the skilled artisan will appreciate that the following discussion is equally applicable to other rotating equipment, examples of which are identified above. The rotatable shaft 11 extends into the pressurized zone 14 wherein the process fluid being pumped is located. The specific arrangement of the pump and the use of mechanical seals to seal the process fluid is known to the skilled artisan, and accordingly a detailed discussion of the pump housing 9 and related structures is not required for a full appreciation of the inventive mechanical seal 10 as discussed in more detail hereafter.

The mechanical seal 10 includes a gland member 17 which has a generally annular shape and is disposed coaxially about the rotatable shaft 11. The gland member 17 is mounted to the pump housing 9 by fasteners (not illustrated) such as bolts or the like such that the gland member 17 is fixed in position relative to the housing 9 and the shaft 11. The gland member 17 has an inside diameter greater than the outside diameter of the shaft 11 such that the gland member 17 is spaced radially outwardly from the shaft 11. On the side of the gland member 17 proximate the process fluid chamber 15, the gland member 17 includes an increased diameter annular step 17a.

In the radial space between the shaft 11 and the gland member 17, a hollow cylindrical shaft sleeve 18 is slidably received coaxially over the shaft 11. The shaft sleeve 18 is nonrotatably secured to the shaft 11 to prevent axial and rotational movement of the sleeve 18 relative to the shaft 11. More particularly, to axially locate the shaft sleeve 18 during installation, the sleeve 18 includes an annular radially outwardly opening channel 19 which is disposed proximate the axially outermost rightward end of the gland member 17. To facilitate axial positioning, a retainer plate 20 has a radially inwardly extending arm which removably seats within the channel 19 and is fixedly secured to the gland member 17 by a bolt 21.

The sleeve 18 is nonrotatably secured to the shaft 11 by a compression fit so as to rotate in combination with the shaft 11. The compression fit is provided by a drive collar 22 which has an annular shape so as to slidably fit about an outer peripheral surface of the sleeve 18. The radially inward facing surface of the collar 22 is tapered so as to receive a triangular projection of an annular compression ring 23 which is disposed mutually adjacent the collar 22 and is threadingly engaged to the drive collar 22 by a bolt 24. The bolt 24 is selectively threaded into the drive collar 22 so as to axially compress the compression ring 23 toward the drive collar 22 and effect a radially inwardly directed compression force onto the sleeve 18 which serves to secure the sleeve 18 onto the shaft 11. Once the shaft sleeve 18 is secured in place, the retainer plate 20 is thereafter removed for seal operation.

To prevent migration of the process fluid between the interfacing surfaces of the sleeve 18 and the shaft 11, an o-ring 25 is confined within an o-ring seat in the sleeve 18 on the axially inward end thereof proximate the process fluid chamber 15. Also on the axially inward end of the sleeve 18, a seal ring seat 26 is defined by a radially outwardly facing stepped portion 27 and a radially outwardly extending annular backing flange 28 which extends into the housing chamber 15.

To effect sealing of the pressurized zone 14 from the low pressure zone 16, the seal ring 12 is positioned on and nonrotatably coupled to the seat 26 so as to rotate in conjunction with the shaft 11. To prevent axial movement of the seal ring 12 relative to the sleeve 18, the seal ring 12 axially abuts on one side against the backing flange 28. An o-ring 29 is confined in a seat formed in the backing flange 28 to prevent migration of process fluid therethrough. The seal ring 12 is restrained on its opposite side by an annular retaining ring 30 which is seated within a corresponding annular channel of the stepped portion 27 of the sleeve 18.

To effect driven rotation of the seal ring 12 in combination with the rotatable shaft 11, the seal ring 12 includes radially inwardly opening drive notches 31 spaced circumferentially about an inner peripheral seal surface which each receive a drive pin 32 therein. The drive pin 32 is fixed to the sleeve 18 and projects radially outwardly from the sleeve 18 into a corresponding one of the notches 31.

To define a sealing region between the pressurized zone 14 and the low pressure zone 16, the axially fixed seal ring 12 includes an annular seal face 33 extending across a radial portion of the seal ring 12. The seal face 33 is substantially flat and faces along the shaft 11 axially towards the driven end thereof for sealing engagement with the opposing seal ring 13 so as to define an annular sealing region therebetween with the pressure zones 14 and 16 disposed at opposite radial edges of the sealing region.

To position the seal ring 13 in the opposing relation with the seal ring 12, a hollow cylindrical shroud or sleeve 34 is disposed within the space between the gland member 17 and the shaft sleeve 18. More particularly, the shroud 34 extends axially with a first end portion disposed in an interfacing relation with the radially inward facing inner peripheral surface of the gland member 17 and includes a second end portion extending axially away from the first end portion toward the seal ring 12. The shroud 34 is oriented substantially parallel with a radially inwardly facing cylindrical surface of the gland member step 17a so as to define an annular space therebetween.

The shroud 34 includes a radially outwardly extending keyed projection 35 which is received within a corresponding notch on the gland member 17 to limit movement of the shroud 34 relative to the gland member 17. The cooperating keyed parts of the shroud 34 and gland member 17 are disposed proximate a radially extending surface of the step 17a formed in the gland member 17. The radially inwardly and axially facing surfaces of the stepped portion 17a and the outer peripheral surface of the shroud 34 define an annular pressure chamber 37 which is enclosed on three sides by the shroud 34 and the step 17a but is open in a direction axially toward the seal ring 13.

At least a back portion of the seal ring 13 is slidably received within the chamber 37 through the open end thereof. To seal the pressure chamber 37 from the high and low pressure zones 14 and 16 respectively, o-rings 40 and 41 are confined within corresponding channels of the respective gland member 17 and shroud 34 to seal the respective outer and inner diameters of the seal ring 13. The seal ring 13 is nonrotatably coupled to the gland member 17 by a drive pin 42 which is fixedly secured to and projects axially from the gland member 17 and into a bore 43 formed in a pressurizable back face 13a of the seal ring 13. Preferably, a plurality of the drive pins 42 are circumferentially spaced about the seal ring 13 although other alternative drive means may be used to nonrotatably connect the seal ring 13 to the gland member 17.

The seal ring 13, similar to the seal ring 12, includes a seal face 44 which is disposed in an opposing relation with the seal face 33 of the corresponding seal ring 12 so as to create the annular sealing region between the opposing seal faces 33 and 44. The seal faces 33 and 44 thereby effect sealing between the zones 14 and 16 which are disposed at the respective radially outer and inner edges of the sealing region. In the illustrated embodiment, the seal faces 33 and 44 typically are in contact during operation although a minimal amount of process fluid is able to migrate therebetween to lubricate and dissipate heat from the seal faces 33 and 44.

To provide a generally axially directed closing force which biases the axially movable seal ring 13 toward the seal ring 12 to vary face contact pressure and effect sealing therebetween, the gland member 17 includes a pressure inlet bore 50 in communication between the pressure chamber 37 and a region exterior of the gland member 17. The exterior end of the bore 50 is formed so as to permit threaded connection to a source of pressurized fluid for supply to the chamber 37, which pressure fluid is controlled to vary the closing forces and the resultant seal face contact pressure as discussed hereinafter.

To monitor the seal ring temperature in the region of the seal faces 33 and 44 and thereby monitor the amount of face contact pressure which causes heat generation, the seal ring 13 also includes a sensor bore 51 extending from the back face 13a of the seal ring 13 toward the seal face 44. A tip end of the sensor bore 51 is disposed proximate the seal face 44 and mounts therein a temperature sensor 52. The sensor bore 52 preferably terminates adjacent to but not completely at the seal face 44 so that the temperature sensor 52 is spaced from the seal face 44 by a very small distance such as, for example, 0.0625 inch (2.461 mm). The spacing of the temperature sensor 52 from the seal face 44 allows for wear of the seal face 44 if such occurs, while avoiding a corresponding wear of the temperature sensor 52.

An electrical lead 53 (diagrammatically represented in FIG. 1 as a dashed line) is connected to the temperature sensor 52. The electrical lead 53 extends out of the seal ring 13 and extends through the gland member 17 through a wiring bore 54 formed therein which extends from the pressure chamber 37 out of the gland member 17. The wiring bore 54 is sealed after the electrical lead 53 is positioned therethrough by a conventional wiring fixture (not illustrated) which seats in the bore 54 so as to prevent a leakage path from forming through the bore 54.

Additionally, a temperature sensor 56 is connected to the gland member 17 so as to detect the temperature of the process fluid in the process fluid chamber 15. The temperature sensor 56 is also connected to an electrical lead 57 which passes through the gland member 17. The temperature sensor 56 in combination with the temperature sensor 52 permits measurement of the temperature differential between the process fluid and the seal faces 33 and 44 so as to generate a feedback signal, which temperature differential increases as the seal face temperature increases in response to contact of the seal faces 33 and 44 during rotation of the shaft 11.

While the temperature sensor 56 monitors the process fluid temperature, the temperature sensor 56 also could be relocated to monitor other parameters such as the temperature of a barrier fluid. Furthermore, while the temperature differential is described herein as the preferred means of monitoring seal ring operation, the skilled artisan will appreciate from the disclosure of the invention contained herein that other operational parameters may be monitored. For example, an increase in the face contact pressure may also create more torque, increase power consumption, cause seal ring distortion, increase wear rate or change electrical conductivity. All of these physical reactions are measurable operational parameters which are usable as a feedback signal.

Figure 3:
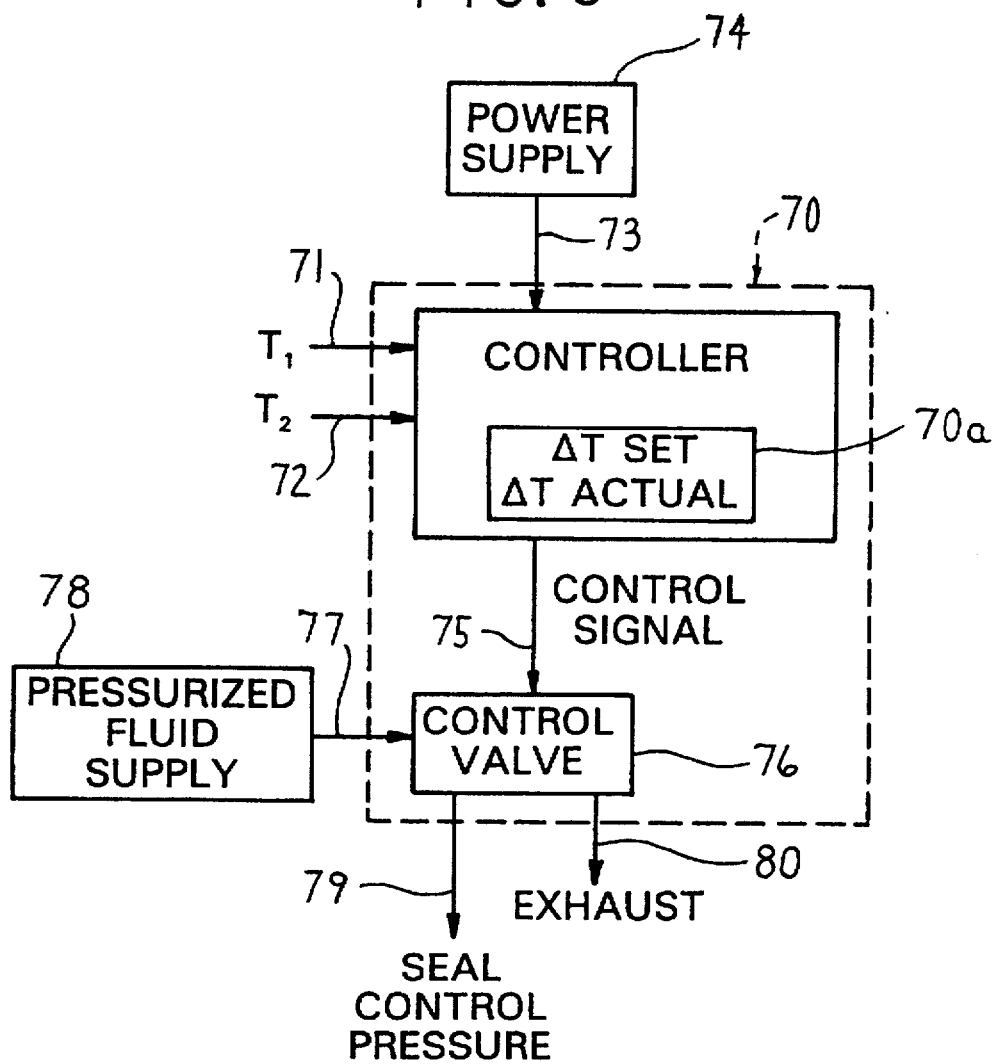
FIG. 3 is a block diagram of a preferred control system for the seal assemblies of FIGS. 1 and 2.

A more detailed discussion of the control system which is connected to the temperature sensors 52 and 56 and is in communication with the pressure chamber 37 is provided herein in the subsequent discussion of FIG. 3.

Further with respect to the seal assembly 10, between the gland member 17 and the sleeve 18, a chamber 60 is defined in the annular space therebetween, which chamber 60 preferably defines the low pressure zone 16.

In the illustrated preferred embodiment, the low pressure zone 16 preferably is separated from the atmospheric pressure area outside of the mechanical seal 12 by an annular bushing 61 which is axially spaced from the seal ring 13. The bushing 61 extends axially from a stepped region of the gland member 17 and radially inwardly towards the shaft sleeve 18 and is disposed to define one end of the chamber 60. The bushing 61 is of an annular construction coaxially disposed about the outer periphery of the sleeve 18 and is axially biased against a step on the inner diameter of the gland member 17 by a spring 62 which is received within and cooperates between a bore in the bushing 61 and an annular retaining plate 63. The retaining plate 16 is disposed closely adjacent and in coaxial alignment with the bushing 61. The retaining plate 63 is prevented from being axially moved out of the space between the gland member 17 and shaft sleeve 18 by a retainer ring 64 which is engaged with the gland member 17 and is disposed in abutting engagement with the retaining plate 63.

The chamber 60 defined between the sealing rings 12 and 13 and the bushing 60 preferably is provided with a quenching fluid which is fed to the chamber 60 through a fluid access port 65 formed through the gland member 17. In the preferred mechanical seal 10, the fluid preferably is water or other similar liquid which circulates into and out of the buffer chamber 60 during operation. While limited leakage of the quenching fluid past the bushing 61 may occur alternatively, the bushing arrangement 61 could be replaced with a second pair of seal rings (not illustrated) to define a double or tandem seal arrangement wherein the fluid in the chamber 60 can be either a liquid or a gas, such as nitrogen which is maintained as required at either a higher or lower pressure relative to the process fluid. The fluid in such an arrangement is commonly referred to as a barrier or buffer fluid. Still further, if the bushing 61 is eliminated or the quenching fluid is not provided, the low pressure zone 14 may be at atmospheric pressure.

Referring to FIG. 3, the control system for the mechanical seal assembly 10 is a controlled feedback loop system which includes a controller 70 that is constructed so as to receive and monitor the temperature readings $T_1$ and $T_2$ wherein $T_1$ is preferably defined as the temperature of the seal face detected by the temperature sensor 52, and $T_2$ is defined as the temperature of the process fluid detected by the temperature sensor 56. While $T_1$ and $T_2$ are identified as the preferred feedback signals for the controller 70, other types of feedback signals may be used such as the alternative operational parameters identified above. The $T_1$ input 71 and the $T_2$ input 72 more particularly are in electrical communication with the respective electrical leads 53 and 57 of the temperature sensors 52 and 56. The controller 70 also includes a power supply input 73 connected to a power supply 74. As the skilled artisan will appreciate, the controller 70 is programmed according to the disclosure herein so as to calculate a temperature differential ($\Delta T$ Actual) between the temperature of the seal faces 33 and 44 and the process fluid. The controller 70 also is programmed so as to store a $\Delta T$ Set which is the temperature differential selected for optimum operation of the mechanical seal assembly 10, which $\Delta T$ Set preferably is in the range of about 10 to about 20 degrees fahrenheit. The optimum $\Delta T$ Set, however, may vary depending, for example, upon the configuration and material of the seal rings 33 and 44. A LED display 70a preferably is provided so as to provide real time feedback to an operator of the $\Delta T$ Actual being measured and the $\Delta T$ Set which is stored within the controller 70. Controller 70 also includes a control signal output 75 for dynamically controlling the operation of the seals 12 and 13, which control is described as follows.

The control system further includes a pressurized fluid control valve 76 which is in communication through a pressurized fluid input 77 to a pressurized fluid supply 78. The control valve 76 further includes a seal control-pressure output 79 which is in communication with and is fixedly connected to the pressure inlet bore 50 (FIG. 1) of the gland member 17 for the supply of pressurized fluid to the pressure chamber 37. The control valve 76 also is operatively connected to an exhaust output 80 to permit the release of pressurized fluid from the pressure chamber 37 through the bore 50 and the seal control pressure line 79. The control valve 76 preferably has three operating conditions which include a pressure fluid supply condition where pressurized fluid is passed through the control valve 76 to the seal control pressure line 79 so as to selectively pressurize the chamber 37, a pressure reduction condition where the pressurized fluid is selectively released from the pressure chamber 37 back through the seal control pressure line 79 and through the exhaust line 80, and a maintaining condition wherein the control valve 76 maintains a constant pressure within the seal chamber 37.

The control valve 76 is operated in response to the control signal received from the computer controller 70 and preferably, the computer controller 70 provides a signal to incrementally vary the pressure injected or released from the pressure chamber 37 in response to changes in the temperature differential, i.e. $\Delta T$ Actual, being measured. During installation of the mechanical seal assembly 10, $\Delta T$ Set is input into the controller 70, which $\Delta T$ Set is the optimum temperature differential between the seal faces 33 and 44 when rotation is occurring. A $\Delta T$ Actual less than the optimum $\Delta T$ Set indicates that heat generation between the seal faces 33 and 44 is not excessive and the face load is too light, while $\Delta T$ Actual exceeding $\Delta T$ Set indicates excessive load occurring between the seal faces 33 and 44. When the shaft 11 is not rotating, the controller 70 controls the control valve 76 so as to provide a maximum pressure to the pressure chamber 37 so as to urge the seal ring 13 toward the seal ring 12 and effect efficient static sealing therebetween.

While the face contact pressure between the seal faces 33 and 44 is highest during the static condition described above, rotation of the shaft 11 causes the seal ring 12 to rotate relative to the seal ring 13 such that contact between the seal faces generates heat therebetween due to the closing forces being applied to the axially movable seal ring 13. Once the $\Delta T$ Actual, which is measured and compared to the $\Delta T$ Set, exceeds the optimum $\Delta T$ Set, the controller 70 reacts so as to vary the load being applied to the seal ring 13 by incrementally varying the pressure of the fluid in the pressure chamber 37 and more particularly, to reduce the closing force being applied to the seal ring 13 so as to reduce the face contact pressures and thereby reduce the heat generation occurring between the seal faces 12 and 13. So long as the $\Delta T$ Actual exceeds the $\Delta T$ Set, the controller reacts so as to incrementally decrease the pressure in the pressure chamber 37 so as to thereby decrease the closing force and further effect a reduction in heat generation. Similarly, if the $\Delta T$ Actual is less than $\Delta T$ Set, the closing is increased. During normal operating conditions, the controller eventually optimizes the $\Delta T$ Actual and maintain $\Delta T$ Actual substantially at $\Delta T$ Set so that only the necessary amount of closing force is being applied to the seal rings 12 and 13.

However, during upset conditions, such as pump cavitation, zero pressure and the like, the process fluid in the high pressure zone 14 may be lost or reduced such that the cooling effect provided by the process fluid is lost. As a result, the heat dissipating effect of the process fluid is reduced and the lubricating process fluid between the seal faces 33 and 44 may also be reduced such that heat generation increases in response to the increased frictional contact between the seal faces 33 and 44. If the ΔT Actual rises above the ΔT Set, the controller 70 reacts so as to incrementally reduce the pressure in the pressure chamber 37 and reduce the closing force acting upon the seal rings 12 and 13.

While conventional seal arrangements are unable to eliminate the loading forces being applied to seal rings, the inventive mechanical seal 10 is able to completely eliminate the pressure provided to the pressure chamber 37 such that it is possible to achieve substantially zero closing force on the seal rings 12 and 13, if necessary, which is desirable during upset conditions so as to prevent frictional contact and heat generation which may result in the destruction or significant damaging of the seal rings 12 and 13. Upon a return to normal operating conditions, the controller 70 immediately reacts as the ΔT Actual decreases so as to incrementally increase the pressure to the pressure chamber 37 and thereby increase the closing forces. The inventive mechanical seal assembly responds sufficiently and quickly such that leakage between the seal faces 33 and 44 is minimized.

Figure 2:
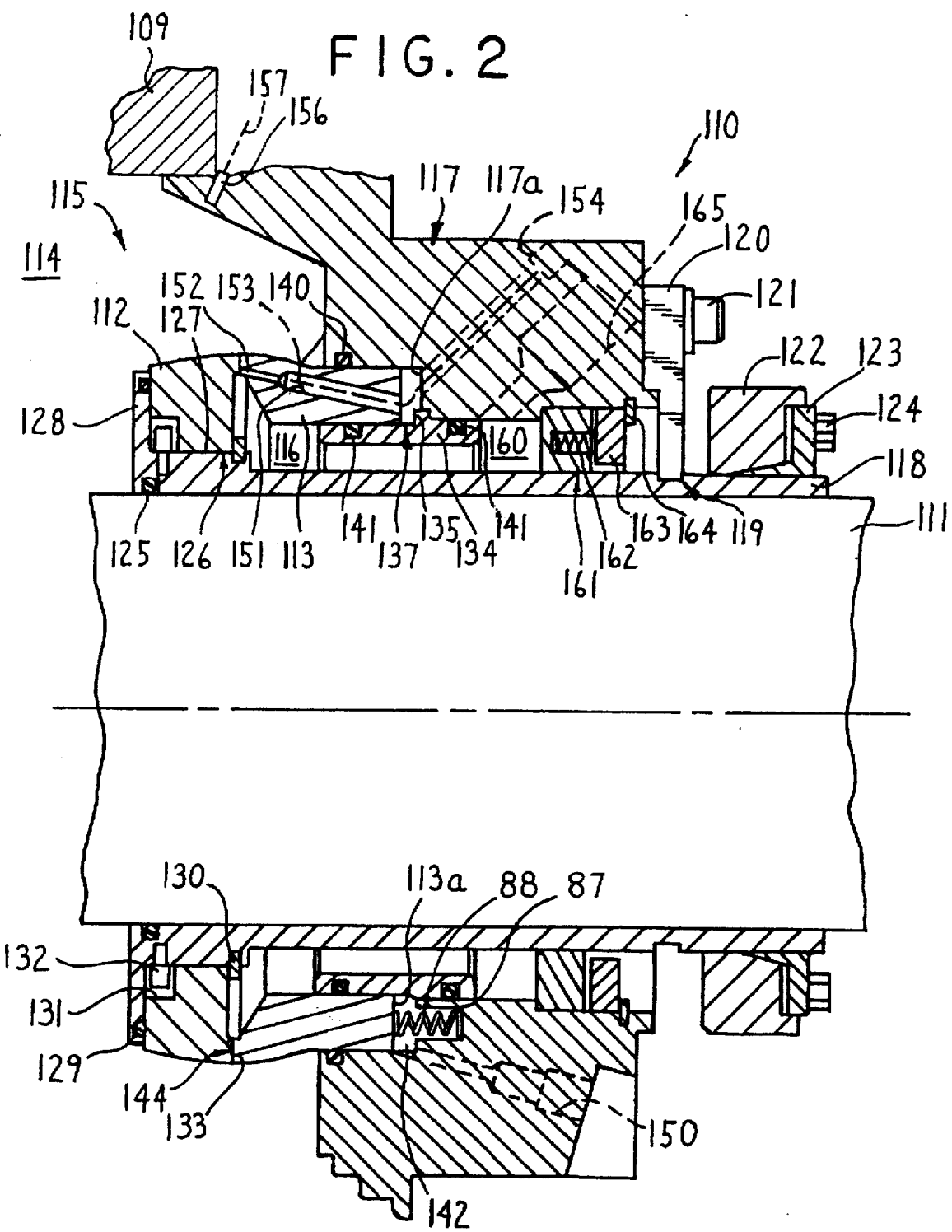
FIG. 2 is a partial side elevational view in cross section illustrating an alternative embodiment of a seal assembly according to the invention.

Reference will now be made to FIG. 2 which illustrates a further variation of the mechanical seal assembly of this invention. In this embodiment, the mechanical seal 110 is arranged similar to the mechanical seal 10 described herein with respect to FIG. 1 and in particular, includes a pair of seal rings 112 and 113 disposed in an opposing sealing relation. It should be understood that the component parts of the embodiment of FIG. 2 are similar to those previously described herein, and accordingly the same reference numerals are used to designate similar parts although the numerals are incrementally increased by 100 to differentiate the embodiments described herein.

The mechanical seal 110 similarly includes a shaft sleeve 118 non-rotatably mounted to the rotatable shaft 111. The shaft sleeve 118 includes the seal ring seat 126 and an annular backing flange 128. The seal ring 112 is restrained on the seal ring seat 128 between the backing flange 128 and a retaining ring 130. The annular backing flange 128 further includes an o-ring 129 which prevents migration of process fluid from the high pressure zone 114 in the seal chamber 115. Thus the seal ring 112 rotates in combination with the shaft 111 so that the opposed seal ring faces 133 and 144 are disposed in sealing engagement to define an annular sealing region and separate the process fluid in the high pressure zone from the buffer fluid in the buffer chamber 160.

The seal ring 113 is the same as the seal ring 13 in that the sensor bore 151 is accessible from within the chamber 37 as is the case in the embodiment of FIG. 1 with the sensor 152 positioned in the bore 151 such that the tip end is disposed a predetermined distance axially away from the seal face 144. The temperature sensor 152 is electrically connected to the lead 153 which extends out of the seal ring 113 to the wiring bore 154 which extends through the gland member 117. The other temperature sensor 156 is similarly positioned to monitor the process fluid temperature and is connected to an electrical lead 157. The seal ring 153 is non-rotatably coupled to the gland member 117 by drive pins (not illustrated in FIG. 2) as described above.

The gland member further includes a buffer fluid access port 165 to supply a buffer fluid to the buffer chamber 160 as previously described herein. The gland member 117 also includes a pressure inlet bore 151 which is in communication with a pressure chamber 137 defined by the gland member 117 and a shroud 134.

While the embodiment of FIG. 1 permits the closing forces acting upon the seal ring 13 to be completely eliminated, it may also be desirable to provide at least a minimal closing force to the axially movable seal ring 113. In accord therewith, the gland member 117 further includes spring seats 87 (one of which is illustrated) each of which opens axially into the pressure chamber 137 and receives a biasing spring 88 which extends from the spring seat 87 and acts on the back face 113a of the seal ring 113. Since the closing force is varied by way of the pressure chamber 137 and the controlled supply of pressure fluid thereto, the springs 88 provides only a minimal and substantially constant closing force which is significantly reduced relative to conventional springs used in conventional seal assemblies which must serve the function of applying a sufficient closing force to the seal rings to prevent leakage during static conditions.

Figure 4:
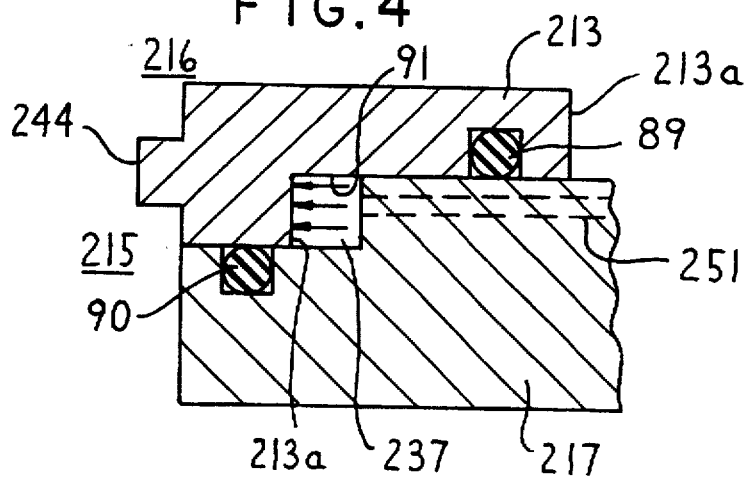
FIG. 4 is a partial side elevational view of a further embodiment illustrating an axially movable seal ring.

In a further embodiment illustrated in FIG. 4, an axially movable seal ring 213 is illustrated mounted to a gland member 217. The seal ring 213 is configured so as to have a stepped portion 91 which defines a seal chamber 237 defined only by the gland member 217 and the seal ring 213. This arrangement, thus, eliminates a shroud 34 or 134 as is the case in the embodiments of FIGS. 1 and 2. The pressure chamber 237 is sealingly separated from the process fluid and buffer fluid by o-rings 89 and 90 where the o-ring 89 is confined in the seal ring 213 and the o-ring 90 is confined by the gland member 217. The pressure chamber 237 is supplied by a pressure inlet bore 251.

Furthermore, the pressure fluid acts only across a pressurizable one of the back faces 213a of the seal ring 213. However, the closing force provided by the pressure fluid is still distributed over a substantial portion of the radial width of the seal ring 213 so as to still minimize deflections resulting from the closing force.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mechanical seal assembly for creating a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate radially outer and inner pressure zones which are defined at opposite radial edges of said annular sealing region and have respective fluid pressures, said first seal ring being nonrotatably coupled to the housing, said second seal ring being nonrotatably coupled to a drive member which is nonrotatably coupled to the shaft so as to rotate in combination with the shaft, comprising the improvement wherein at least one of said first and second seal rings is axially movable relative to the other of said first and second seal rings and includes a pressurizing face facing in a direction away from said seal face thereof, said pressurizing face being sealingly separated from said seal face, said mechanical seal assembly including pressurizing means having a pressure fluid acting directly on said pressurizing face for applying an axially directed fluid pressure on said pressurizing face, said pressurizing means including control means for varying said fluid pressure of said pressure fluid being applied to said pressurizing face to vary an axial position of said at least one movable seal ring relative to the other said seal ring, said control means varying said fluid pressure of said pressure fluid relative to said respective fluid pressures of said inner and outer pressure zones.

2. A mechanical seal assembly according to claim 1, wherein said pressurizing means includes means defining a chamber adjacent said axially movable seal ring, said chamber opening at least axially toward said pressurizing face and being sealingly separated from said inner and outer pressure zones, said pressurizing means further including pressure supply means which is connected to said control means and is in communication with said chamber for supplying fluid to said chamber to vary said fluid pressure acting upon said pressurizing face.

3. A mechanical seal assembly according to claim 2, wherein said pressurizing face extends radially across a substantial radial width of said seal ring such that said fluid pressure is distributed over said pressurizing face to minimize distortion of said movable seal ring, said pressurizing face having a constant area.

4. A mechanical seal assembly according to claim 1, wherein said pressure fluid defines a closing force acting axially upon said movable seal ring toward said seal faces to displace said movable seal ring toward said other seal ring, said pressurizing means including fluid supply means connected to said control means for varying said fluid pressure in response to said control means so as to vary said closing force between a zero-closing force condition and an increased closing force condition during shaft rotation.

5. A mechanical seal assembly according to claim 4, including sensor means for detecting an operational parameter of said mechanical seal which varies in response to a variation of said closing force, said pressurizing means being connected to said sensor means such that said fluid pressure is varied in response to variations in said operational parameter being detected to vary said closing force.

6. A mechanical seal assembly according to claim 5, wherein said operational parameter is a temperature of at least one of said seal faces which is detected by said sensor means.

7. A mechanical seal assembly according to claim 1, wherein said movable seal ring is said first seal ring, said second seal ring being axially restrained by retainer means for preventing axial movement of said second seal ring relative to said drive member.

8. In a mechanical seal assembly for creating a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate radially outer and inner pressure zones which are defined at opposite radial edges of said annular sealing region, said first seal ring being nonrotatably coupled to the housing, said second seal ring being nonrotatably coupled relative to the shaft so as to rotate in combination with the shaft, comprising the improvement wherein one of said first and second seal rings is axially movable relative to said housing and the other of said first and second seal rings is axially fixed relative to said shaft, said movable seal ring including a back face which faces away from said seal face thereof, said mechanical seal assembly including displacement means for solely applying a closing force on said movable seal ring, said displacement means acting directly upon said back face of said movable seal ring, said closing force tending to move said movable seal ring toward said fixed seal ring and being variable by said displacement means, said displacement means further including pressure supply means for applying a pressure fluid to said back face to vary a fluid pressure of said pressure fluid and thereby vary said closing force, said closing force being provided solely by said pressure fluid such that substantially no closing force acts on said movable seal ring when said fluid pressure is substantially zero.

9. A mechanical seal assembly according to claim 8, wherein said mechanical seal assembly is a contacting type seal arrangement, said displacement means being operable to vary said closing force and thereby vary a face contact pressure between the seal face.

10. A mechanical seal assembly according to claim 8, wherein said displacement means includes means defining a chamber adjacent said axially movable seal ring, said chamber opening at least axially toward said back face of said movable seal ring, said pressure supply means being in communication with said chamber for supplying said pressure fluid to said chamber to vary a fluid pressure of said fluid acting upon said back face and thereby vary said closing force.

11. A mechanical seal assembly according to claim 10, wherein said back face extends radially across a substantial radial width of said movable seal ring such that said fluid pressure is distributed over said back face.

12. A mechanical seal assembly according to claim 8, wherein said displacement means of said mechanical seal assembly includes sensor means for detecting an operational parameter which varies in response to a variation of said closing force, and pressure means connected to said sensor means for varying said closing force in response to variations in said operational parameter being detected.

13. A mechanical seal assembly according to claim 12, wherein said sensor means comprises temperature sensing means for detecting a temperature proximate said seal faces and a temperature in one of said outer and inner pressure zones, said operational parameter being a temperature differential detected between said temperature proximate said seal faces and said temperature in one of said outer and inner pressure zones, said displacement means being connected to said temperature sensing means so that said closing force on said back face is varied in dependency upon said temperature differential.

14. In a mechanical seal assembly for creating a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate radially outer and inner pressure zones which are defined at opposite radial edges of said annular sealing region, said first seal ring being nonrotatably coupled to the housing, said second seal ring being nonrotatably coupled relative to the shaft so as to rotate in combination with the shaft, comprising the improvement wherein one of said first and second seal rings is axially movable relative to said housing and the other of said first and second seal rings is axially fixed relative to said shaft, said movable seal ring including a back face which faces away from said seal face thereof, said mechanical seal assembly including displacement means for solely applying a closing force on said movable seal ring, said displacement means acting directly upon said back face of said movable seal ring, said closing force tending to move said movable seal ring toward said fixed seal ring and being variable by said displacement means, said seal assembly including means defining a chamber which opens toward at least said back face of said movable seal ring, said chamber being sealed from said pressure zones during axial movement of said first seal ring, said chamber being in communication with pressure supply means for providing a variable pressure fluid to said chamber to apply said variable closing force which is distributed over said back face, said back face extending radially outwardly and having a constant area.

15. In a mechanical seal assembly for creating a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and contacting relation with one another to define an annular sealing region therebetween to effectively separate radially outer and inner pressure zones which are defined at opposite radial edges of said annular sealing region, said first seal ring being nonrotatably coupled to the housing, said second seal ring being nonrotatably coupled relative to the shaft so as to rotate in combination with the shaft, said seal faces being in substantially parallel relation during shaft rotation, comprising the improvement wherein one of said first and second seal rings is axially moveable relative to the other of said first and second seal rings, said mechanical seal assembly including displacement means which are actable upon said movable seal ring for displacing said movable seal ring axially to vary a face contact pressure generated between said seal faces, said seal assembly including sensor means for detecting an operational parameter which varies in response to a variation of said face contact pressure, said displacement means being connected to said sensor means for varying said face contact pressure in response to variations in said operational parameter being detected, said seal faces being maintained in said substantially parallel relation as said face contact pressure is varied, said displacement means including means defining a chamber adjacent said movable seal ring, said chamber opening at least axially toward a back face of said movable seal ring and being sealed from said inner and outer pressure zones, said displacement means further including pressure supply means in communication with said chamber for supplying a pressure fluid to said chamber to vary a fluid pressure acting upon said back face and thereby vary said closing force.

16. A mechanical seal assembly according to claim 15, wherein said displacement means applies a closing force tending to displace said movable seal ring axially toward the other said seal ring, said displacement means being operable to vary said closing force and thereby vary said face contact pressure between said seal faces.

17. A mechanical seal assembly according to claim 16, wherein said pressure fluid defines said closing force acting upon said movable seal ring to displace said movable seal ring toward said other seal ring, said closing force being provided solely by said pressure fluid such that substantially no closing force acts on said movable seal ring when said fluid pressure is substantially zero.

18. A mechanical seal assembly according to claim 15, wherein biasing means are disposed within said chamber and connected between said housing and said movable seal ring to provide a small constant closing force in combination with said variable closing force.

19. A mechanical seal assembly according to claim 15, wherein said sensor means includes a temperature sensor disposed within at least one of said first and second seal rings proximate to but spaced from said seal face so as to accommodate wear of said seal face.

20. A mechanical seal assembly according to claim 15, wherein said operational parameter is a temperature differential between a temperature proximate said seal faces and a temperature in one of said outer and inner pressure zones, control means being operatively connected to said sensor means and said displacement means for monitoring said temperature differential detected by said sensor means to a set temperature differential, said control means selectively actuating said displacement means so as to maintain said actual temperature differential substantially at said set temperature differential.

21. A mechanical seal assembly according to claim 20, wherein said set temperature differential is within a range of 10 to 20 degrees fahrenheit.

22. A method of operating a mechanical seal assembly to create a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate radially outer and inner pressure zones which are defined at opposite radial edges of said annular sealing region and have respective fluid pressures therein, said first seal ring being nonrotatably coupled to the housing, said second seal ring being nonrotatably coupled relative to the shaft so as to rotate in combination with the shaft, said first seal ring being axially movable relative to said housing and said second seal ring being axially fixed relative to said shaft, said mechanical seal assembly including displacement means which acts directly upon a back face of said first seal ring which faces away from said seal face thereof, the method comprising the steps of:

applying a variable closing force acting on said back face of said first seal ring by said displacement means to create said sealing relationship between said first and second seal rings, said displacement means comprising pressurizing means for applying an axially directed fluid pressure on said back face to bias said first seal ring toward said second seal ring, said closing force being varied by varying said axially directed fluid pressure on said back face relative to said respective fluid pressures of said inner and outer pressure zones;

sensing an actual operational parameter of said seal assembly, said actual operational parameter being variable in response to said closing force; and varying said closing force being applied to said back face of said first seal ring during shaft rotation to vary said actual operational parameter.

23. A method of operating a seal assembly according to claim 22, further including the steps of setting a set operational parameter in a control means for varying said closing force and comparing said actual operational parameter to said set operational parameter, said closing force being varied to adjust said actual operational parameter so as to be less than said set operational parameter.

24. A mechanical seal assembly according to claim 22, wherein said operational parameter is a temperature differential measured between a seal face temperature of at least one of said seal faces and a temperature of one of said outer and inner pressure zones, said closing force applying a face contact pressure between said seal faces which said face contact pressure varies said seal face temperature.

* * * * *

UNITED STATES PATENT AND TRADEMARK OFFICE
CERTIFICATE OF CORRECTION

PATENT NO. : 5 762 342
DATED : June 9, 1998
INVENTOR(S) : Kenneth G. KAKABAKER et al It is certified that error appears in the above-indentified patent and that said Letters Patent is hereby corrected as shown below:

Column 12, line 20; change "face" to ---faces---.

Signed and Sealed this

Twelfth Day of January, 1999

Attest:

Attesting Officer     *Acting Commissioner of Patents and Trademarks*